United States Patent [19]

Davis

[11] Patent Number: 5,405,117
[45] Date of Patent: Apr. 11, 1995

[54] GLIDING CEILING MONITOR SUPPORT ASSEMBLY

[76] Inventor: Greig S. Davis, 30263 Southampton La., Farmington Hills, Mich. 48331

[21] Appl. No.: 147,323

[22] Filed: Oct. 27, 1993

[51] Int. Cl.$^6$ ............................................. A49H 1/10
[52] U.S. Cl. .................................... 248/333; 248/323; 248/919; 248/921
[58] Field of Search ............... 248/323, 327, 317, 326, 248/333, 917, 918, 919, 920, 921, 922

[56] References Cited

U.S. PATENT DOCUMENTS

| | | | |
|---|---|---|---|
| 1,123,890 | 7/1915 | Killpatrick | 248/323 |
| 1,796,994 | 3/1931 | Husted | 248/323 |
| 3,096,064 | 7/1963 | Leonard | 248/323 |
| 3,519,237 | 7/1970 | Dunn | 248/327 |
| 4,127,252 | 11/1978 | Splawn . | |
| 4,516,751 | 5/1985 | Westbrook . | |
| 4,562,987 | 1/1986 | Leeds | 248/920 X |
| 4,566,663 | 1/1986 | Barchus . | |
| 4,659,048 | 4/1987 | Fahrion . | |
| 4,738,369 | 4/1988 | Desjardins . | |
| 4,779,922 | 10/1989 | Cooper | 248/920 X |
| 4,836,478 | 6/1989 | Sweere . | |
| 4,868,845 | 9/1989 | Koropp . | |
| 4,959,645 | 9/1990 | Balz . | |
| 4,964,606 | 10/1990 | Beam et al. . | |
| 4,993,676 | 2/1991 | Fitts et al. . | |
| 5,009,384 | 4/1991 | Gerke | 248/317 X |
| 5,165,647 | 11/1992 | Ribeiro . | |
| 5,179,367 | 1/1993 | Shimizu . | |
| 5,271,590 | 12/1993 | Rosen | 248/917 X |

FOREIGN PATENT DOCUMENTS

| | | | |
|---|---|---|---|
| 0445331 | 9/1991 | European Pat. Off. | 248/920 |
| 2418414 | 10/1979 | France | 248/327 |

*Primary Examiner*—J. Franklin Foss
*Attorney, Agent, or Firm*—Brooks & Kushman

[57] ABSTRACT

A monitor support assembly is provided having a pre-wired monitor support assembly supported from a ceiling rail comprising an elongate channel affixable to the ceiling rail, a support arm having an internal cavity extending completely therethrough, a roller means for slidably connecting the support arm to the elongate channel where the roller means is slidable along the elongate channel in a horizontal direction, a monitor platform affixed to the support arm for supporting a monitor and a monitor wiring assembly for providing power and data communication to the monitor wherein the support arm internal cavity is adapted to receive and guide the wiring monitor wiring assembly.

13 Claims, 3 Drawing Sheets

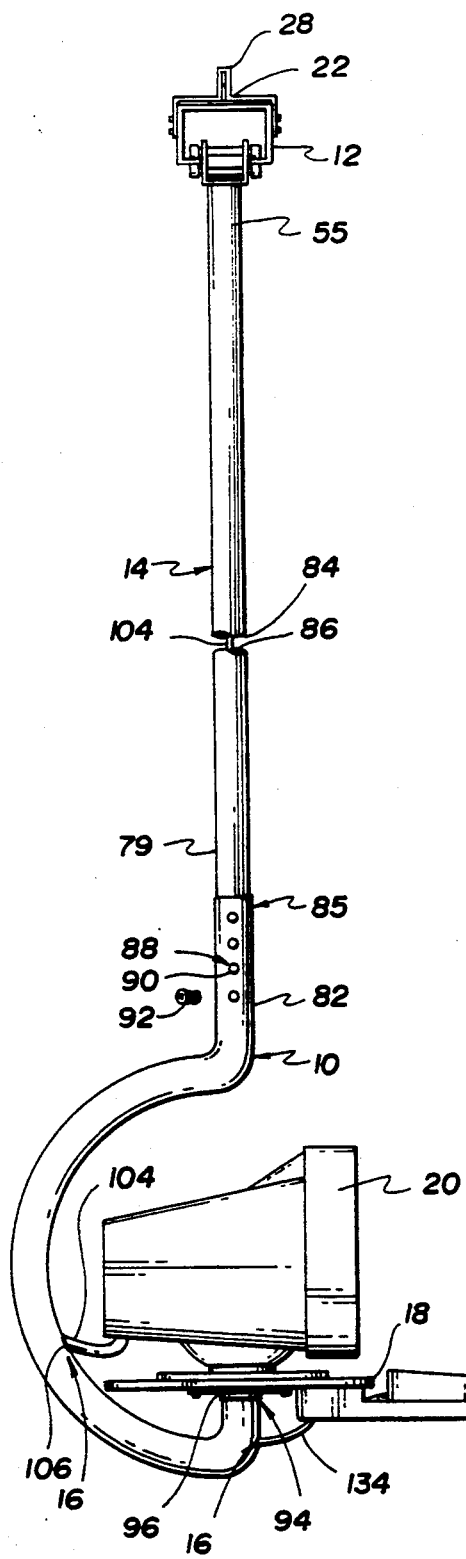
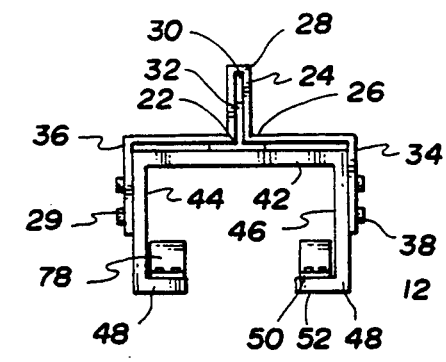
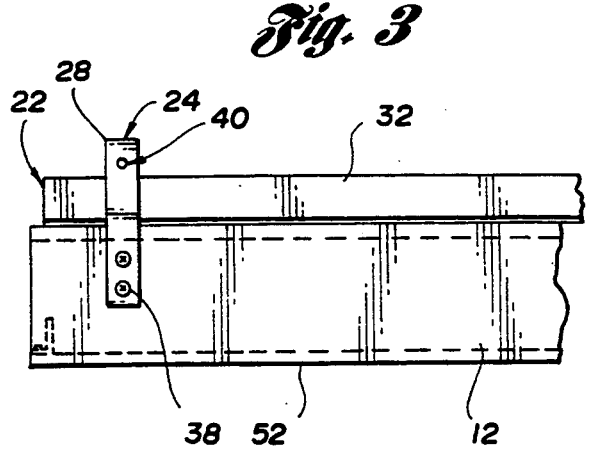

GLIDING CEILING MONITOR SUPPORT ASSEMBLY

TECHNICAL FIELD

The present invention relates generally to monitor support assemblies, and more particularly to computer monitor support assemblies slidable in a horizontal direction along a ceiling structure.

BACKGROUND ART

As those skilled in the art will recognize, the proliferation of personal computers has increased dramatically in recent years due to the significant increase in computing power and the relatively low cost of available computer technology. Personal computers have thus become accessible to a large number of users having many diverse applications such as computer aided design, desktop publishing, word processing, advertising and graphic layouts, sales and promotion applications and accounting programs. Traditional dedicated office work stations including printers, disc drives and other peripheral devices used by many various individuals are being replaced by standard, personalized desktop work stations.

In conjunction with the above trends, almost all mainframe computers have been converted to "on line" user status with numerous users sharing in the available computing power by accessing the mainframe from communications lines and interactive computing stations located at personalized work stations. It is apparent that the need for efficient, ergonomically sound computer related accessories including computer monitor supports is increasing.

As those skilled in the art will further recognize, the standard desktop work station at a minimum includes a computer monitor screen and a key board, with the personal computer located remotely and connected to the monitor and keyboard by communications lines. The monitor and keyboard may also be located directly adjacent the computer in some desktop configurations. Connection of an individual monitor and key board to a mainframe computer requires communications lines as described above. In both applications, the monitor and keyboard must be generally placed where they are easily accessible to the individual user.

Conventionally, the monitor and keyboard have been conveniently located on top of a horizontal desktop surface to place the monitor and keyboard within easy reach of the user. This conventional placement of the monitor and keyboard atop the desktop surface, however, creates unique problems with respect to the unsightly communications and power cables that are attendant in operative connection of the computer.

It is understood that typically, the user must have sufficient room available on the desktop surface for drawings, preliminary drafts, reference materials, artwork etc. that is necessary to generate the output required. Thus, at a minimum the monitor and keyboard must be located accordingly to accommodate the need for space for work materials. Additionally, those skilled in the art will recognize that rarely is the computer monitor and keyboard the sole focus of the user's daily work activities. Thus numerous other work aids and equipment compete with the computer monitor and keyboard for valuable space on the desktop surface or office area.

A previous attempt to address the above-noted space problem attendant in conventional work stations is disclosed, for example in U.S. Pat. No. 4,836,478 to Sweere, issued Jun. 6, 1989. Specifically the '478 patent discloses a suspension system for a personal computer monitor comprising a carriage in which the monitor is mounted. The carriage is supported from above by a frictionally secured swivel and tilt mechanism which is in turn attached to a pivotable and rotatable support arm. The arm is supported by a pressurized pneumatic cylinder mounted on a roller assembly permitting the monitor to be raised and lowered vertically and also tilted rotated and/or swiveled Similarly, U.S. Pat. No. 4,993,676 to Fitts et al., issued Feb. 19, 1991, discloses an apparatus for mounting a television set from an home ceiling that has spaced apart joists such as wooden two-by-fours placed on the edge and a ceiling panel secured to the underside of the joists. The apparatus includes an L-shaped bracket and a hollow shaft connected to one of the legs of the bracket so as to form a U-shaped hook that is engageable in flush contact with a ceiling joist.

Still further, U.S. Pat. No. 4,964,606 to Beam et al., issued Oct. 23, 1990, discloses a mounting structure for a CRT display which includes a pair of tubular support members with the first support member secured to a ceiling surface and the second support member mounted to the first support member. Knobs are included to lock the second support member in an adjusted position within the first support member. A yoke assembly is secured to one end of the second tubular support member and a tray is rotatably secured to the yoke member for supporting the display.

While each of the above patents discloses a structure for mounting computers or television monitors, they fail to effectively address the space and wiring problems discussed above. The Beam et al. and Fitts et al patents fail to disclose a mounting assembly which is moveable in a horizontal direction. The Sweene patent fails to disclose a mounting assembly which is mountable from a ceiling structure to save office space.

DISCLOSURE OF THE INVENTION

It is a general object of the present invention to address the work station space problem referenced above and overcome the limitations of the prior art by providing a pre-wired monitor support assembly supported from a ceiling rail comprising an elongate channel affixable to the ceiling rail, a support arm having an internal cavity extending completely therethrough, a roller means for slidably connecting the support arm to the elongate channel where the roller means is slidable along the elongate channel in a horizontal direction, a monitor platform affixed to the support arm for supporting a monitor and a monitor wiring assembly for providing power and data communication to the monitor wherein the support arm internal cavity is adapted to receive and guide the wiring monitor wiring assembly.

A more specific object of the present invention is the additional provision of a support arm including means for adjusting the length of the support arm and thereby adjusting the distance of the monitor platform in relation to the elongate channel and further including a wiring assembly having a power cable, a data communication cable and a keyboard cable.

Yet another more specific object of the present invention is the further provision of an elongate channel which is C-shaped in cross section, and includes a central section, a pair of spaced apart legs extending from the central section and a pair of shoulders each extending in a facing relationship toward each other from each of the pair of legs, the shoulders each having an inner surface and an outer surface and the roller means including a roller bracket having at least a pair of roller bearings affixed thereto whereby the pair of roller bearings are adapted to cooperate with the inner surface of the shoulders to form a bearing race assembly capable of slidably supporting the support arm from the elongate channel.

Other objects, advantages, and embodiments of this invention will be readily understood by those skilled in the art upon review of the accompanying drawings, taken together with the following detailed description which illustrates and describes what are presently considered to be preferred embodiments of the best mode contemplated for utilizing the invention which is defined in the claims attached hereto.

BRIEF DESCRIPTION OF THE DRAWINGS

FIG. 1 is a side view of the pre-wired monitor support assembly of the present invention.

FIG. 2 is front view of the track channel of the present invention.

FIG. 3 is a fragmentary side view of the track channel of the present invention illustrating the connection of a ceiling rail clamp.

BEST MODE FOR CARRYING OUT THE INVENTION

Figure 4:
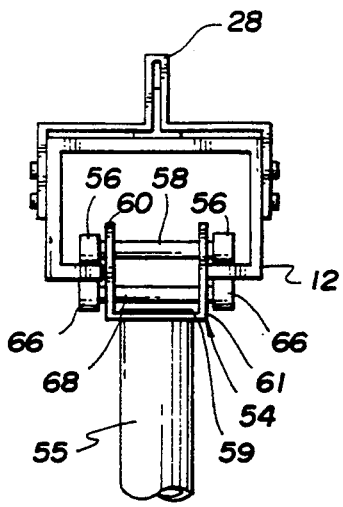
FIG. 4 is a fragmentary front view of the track channel, roller bracket and support arm of the present invention.

Referring now to FIG. 1, there is shown generally a pre-wired monitor support assembly designed in accordance with the teachings of the present invention and designated generally by reference numeral 10. Pre-wired support assembly 10 includes an elongate channel member 12, a support arm 14, a support arm 16 and a mounting platform 18. Monitor 20 is shown in FIG. 1 supported atop mounting platform 18.

Referring to FIGS. 1, 2 and 3, elongate channel member 12 is shown affixed to ceiling rail 22 by a clamp 24. Ceiling rail 22 is of the conventional type known in the art used for drop ceilings, having an inverted T-shaped cross section. A plurality of ceiling rails 22 are normally arranged in a grid-like configuration (not shown) where a plurality of ceiling panels (not shown) are rested upon the outer leg members 26 of the rails 22.

In keeping with the invention, clamp 24 is formed from stamped sheet metal, but as recognized by Applicant may be manufactured from any conventional structural material. Clamp 24 is provided with an attachment segment 28 including a cavity 30 defined therein and configured to accept the extending portion 32 of ceiling rail 22. Extending from attachment segment 28 are legs 34 and 36 which are configured to enclose a top portion 29 of channel member 12. Common fasteners such as conventional sheet metal screws 38 are shown fastening legs 34 and 36 to channel member 12. A fastening aperture 40 is included within the attachment segment 28 for further securing the clamp 24 by a suspension wire (not shown) for added support from connection to roof beams or girders if needed.

Referring now to FIG. 2, it is seen that in the preferred embodiment elongate channel member 12 is substantially C-shaped in cross section. As shown, elongate channel member includes a central section 42 and a pair of spaced apart legs 44 and 46 extending from central section 42. Each leg further includes a shoulder 48. The shoulders 48 extend toward each other in a parallel facing relationship. Shoulder members 48 each include an inner surface 50 and an outer surface 52.

Figure 5:
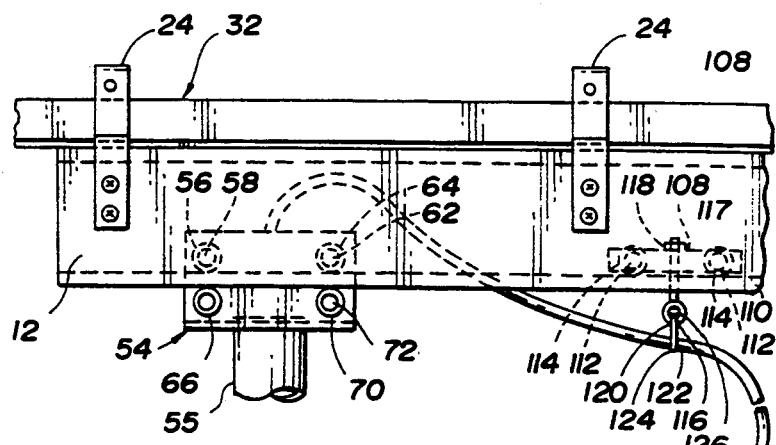
FIG. 5 is a fragmentary side view of the track channel illustrating the roller bracket, cable truck and wiring assembly in phantom.

As shown in FIGS. 4 and 5, also in the preferred embodiment a U-shaped roller bracket 54 connects a first end 55 of support arm 14 to elongate channel 12. Roller bracket 54 includes a first upper pair of roller bearings 56 supported upon an axle 58 extending across the legs 60 of bracket 54. A second identical upper pair of roller bearings 62 is shown in FIG. 5 disposed directly adjacent first pair of roller bearings 56. Roller bearings 62 are also supported by an axle 64.

Roller bracket 54 further includes a first lower pair of roller bearings 66 supported upon an axle 68 extending across the legs 60 of bracket 54. A second identical lower pair of roller bearings 70 is shown in FIG. 5 disposed directly adjacent first lower pair 66. Roller bearings 70 are similarly supported by an axle 72.

Referring still to FIGS. 4–5, in the preferred embodiment first and second upper roller bearings 56 and 62 are configured to abuttingly engage the parallel inner surfaces 50 of opposing shoulders 48. Similarly first and second lower roller bearings 66 and 70 are adapted to abuttingly engage the outer surfaces 52 of shoulders 48. The combination of the roller bearings 56, 62, 66 and 70 and the inner and outer surfaces 50 and 52 cooperate to define a bearing race assembly this permitting the support arm 14 to slide easily in the horizontal direction. Use of conventional roller bearings 56, 60, 66 and 70 afford ease of movement of the support arm and the connected monitor support platform to any horizontal position along the length of elongate channel 12. A pair of positive stops 78 are illustrated in FIG. 2 and are used to prevent the roller bracket from traveling past the end of channel 12.

Referring now to FIG. 1, support arm 14 is shown connected at end 55 to bracket 54 by any conventional fastening means including, providing a threaded aperture in the bracket 54 and a cooperating threaded end or providing a aperture in bracket 54 and extending end 55 inside the aperture and subsequently forming a retaining lip onto end 55. The preferred embodiment shown in FIG. 1 utilizes a threaded end 59 on extending end 55 and a cooperating threaded nut or washer 61 for retaining threaded end 59 within bracket 54.

Support arm 14 is connected at second end 79 to a C-shaped lower support arm 82. Support arms 80 and 82 are hollow and thus include internal cavities 84 and 86 which extend through the length of the respective support arms. Lower support arm 82 includes a connection section 85 wherein the cavity 86 is sufficiently large to accept the second end 79 of support arm 14. In this manner, the support arms are telescopically connected and adjustable in the vertical direction. Apertures 88 and 90 are included in second end 79 and connection section 85 respectively, which can be easily coaxially aligned. Fasteners 92 extend through the coaxially aligned apertures 88 and 90 to secure the arms 14 and 82 together.

Apertures 88 and 90 are placed at predetermined locations for allowing adjustment of the supports arms vertically with respect to each other. Support arms 14 and 82 are manufactured from 1⅜ inch diameter aluminum tubing. It is contemplated than various materials with different diameters may be used for manufacturing the arms dependent upon the overall weight of the monitor to be supported and other structural considerations known in the art.

Still referring to FIG. 1, a collar 96 is attached to end 94 of curved support arm 82. Collar 96 is affixed to monitor platform by common fasteners 98 extending through collar 96 and into monitor platform 18. A keyboard 100 is shown resting on top of keyboard tray 102 affixed to monitor support 18. Wiring assembly 104 is shown entering aperture 106 which is in communication with internal cavity 82. Wiring assembly 106 is configured to travel up through internal cavity 82 and into internal cavity 81 of support arm 14.

Referring now to FIG. 5, wiring assembly 104 extends out from internal cavity 84, past roller bracket 54 (shown in phantom) and into channel member 12. Cable truck 108 is shown adjacent roller bracket 54. Cable truck 108 includes a base 110, two pair of spaced apart roller bearings 112 supported on respective axles 114. The operation of roller bearings 112 is substantially identical to the operation of the roller bearings discussed previously except that only an upper pair of roller bearings is utilized to slidably support the cable truck on the inner surfaces of the shoulders 48. Cable truck 108 has a conventional eye bolt 116 extending through an aperture 117. A conventional nut 118 is tightened onto the threaded end of the eye bolt for securing the eye bolt to the cable truck.

Eye bolt 116 has a support hole 120. A strap 122 encompasses and receives wiring assembly 104 at one end 124 and is affixed within support hole 120 at the other end 126. In this manner, wiring assembly 104 travels up through support arms 14 and 80, past bracket 54 and is finally supported by eye bolt 116. Cable truck 108 may then travel in conjunction with roller bracket 54 to any position located along the length of the elongate channel 12.

Wiring assembly 104 includes at least a power cable 130, a data communication cable 132, and a keyboard communication cable 134. Cables 130, 132 and 134 are, as those skilled in the art will understand, operatively connected to their respective receiving devices or power supplies. For example, power cable 130 should be connected to a conventional power source, data communication and keyboard cables should be connected to the personal computer or mainframe computer. It is contemplated that any number of various peripheral device cables may be incorporated into the wiring assembly and received within the support arms and cable truck of the present invention i.e. printer cables, facsimile communication cables, video and audio transmission cables for multimedia compatible computers and the like. It is contemplated that the support assembly of the present invention may be provided in an un-wired form such that the consumer may custom wire any application as needed.

Figure 6:
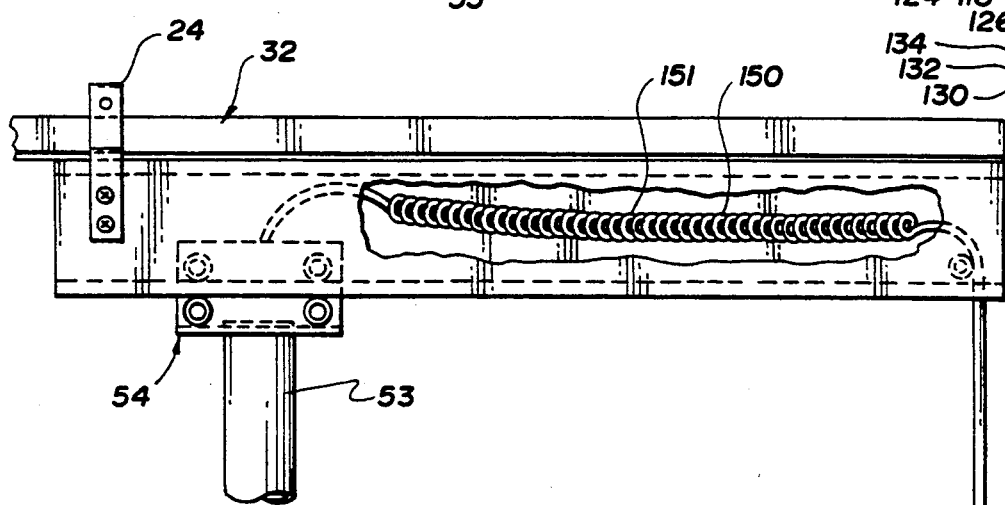
FIG. 6 is a side view of the track channel and a tentative embodiment of the roller bracket and wiring assembly of the present invention.
Figure 7:
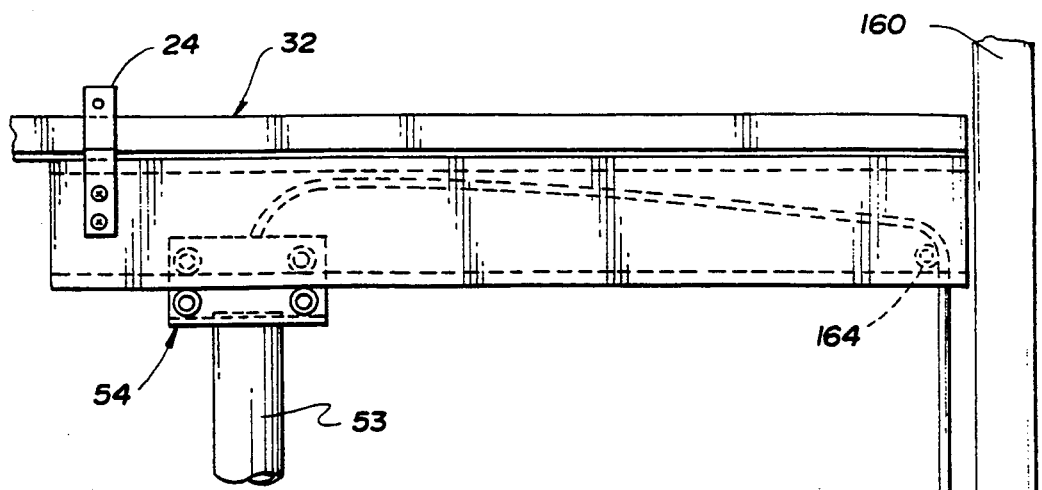
FIG. 7 is a side view of the track assembly and yet another alternative embodiment of the wiring assembly of the present invention.

Alternatively, as shown in FIG. 6, a coiled cable assembly 150 having an outer coiled encasement portion 151 is used to support cables 130, 132 and 134. In addition, as shown in FIG. 7, wiring assembly 104 can simply be routed to near adjacent wall 160. Wiring assembly 104 is designed to pass through aperture 162 of channel 12 and travel around pulley 164. Wiring assembly 104 is at a lower portion of the wall 166 connected to a weight assembly 168 for biasing the entire wiring assembly 104 downward. It is contemplated that the weighted wiring assembly 104 is the preferred embodiment of the present invention.

Having described the structural aspects of the present invention in detail, attention is now turned to the operational characteristics and advantages of the present invention. The provision of the monitor platform on the support assembly of the present invention allows the monitor 20 and keyboard 100 to be removed from placement on top of the users desktop surface (not shown). The ability of the entire support assembly 10 to move in a predefined horizontal directional allows the user to move the monitor and keyboard, not only off the desktop, but into different positions within the users work area. As the needs of the user change with respect to the space required for use on a desktop or office area, a horizontal movement of the support assembly 10 opens up new space by taking advantage of wasted space which the assembly may be moved into.

The utilization of roller bearings both in the roller bracket assembly 54 and cable truck 108 ensure that movement of the support assembly is easily accomplished with a minimum of effort. No lifting or pivoting of the monitor or keyboard is necessary. Additionally, the availability of telescopic vertical adjustment is also advantageous to diverse work environments where users of different physical stature maybe required to work at different computer work stations.

Significantly, the combination of the cable truck assembly 108 and the ho].low support arms 14 and 82 greatly reduce the often unsightly visual aspects of computer cables. The present invention provides a means for hiding these cables from view at eye level while not effecting the operational characteristics of the computer work station. The present invention also affords this visually pleasing characteristic in a manner such that the support assembly is still movable along the length of the elongate channel 12.

Lastly, the present invention is cooperable with conventional drop ceilings used extensively in the business and retail commercial environments, as such, little or no modification is necessary to install the monitor support assembly to existing drop ceiling structures.

While the principles of the present invention have been made clear in the illustrated embodiments, it will be obvious to those skilled in the art that many modifications of structure, arrangements and components can be made particularly adapted for specific environments and operating requirements without departing from those principles. The appended claims are therefore intended to cover and embrace any such modifications, within the limits of the scope of the invention.

What is claimed is:

1. A pre-wired support assembly for supporting a computer monitor from a ceiling assembly having a plurality of ceiling rails comprising:
   an elongate channel member including a central section, a pair of spaced apart legs extending from said central section and a pair of shoulder members each extending in a facing relationship toward each other from each of said pair of legs;

a clamp means for affixing said elongate channel member to said ceiling rail;

a telescopically adjustable support member having a first end and a second end and an internal cavity extending completely therethrough;

a roller means for slidably connecting said first end of said support member to said shoulder members of said elongate channel member, said roller means slidable along said shoulder members in only a horizontal direction;

a monitor platform affixed to said second end of said support member for supporting a monitor including a keyboard platform extending therefrom; and a monitor wiring assembly for providing power and data communication to said monitor wherein said support member internal cavity is adapted to receive and guide said monitor wiring assembly to said elongate channel member.

2. A pre-wired support assembly for supporting a computer monitor as in claim 1 wherein said ceiling rail has an inverted "T" shaped cross section and said clamping means comprises an attachment segment including a notch adapted for connection to said ceiling rail and a pair of leg members extending from opposite sides of said attachment segment, said leg member each having a fastening means for fastening said leg members to said elongate channel member.

3. A pre-wired support assembly as in claim 1 wherein said support member includes means for telescopically adjusting the vertical length of said support member predetermined amounts and thereby adjusting the distance of the monitor platform in relation to said elongate channel member.

4. A pre-wired support assembly as in claim 1 wherein said adjustment means comprises a pair of elongated tubular support members, one of which is telescopically mounted within the other having a means for setting the amount of movement between the support member to predetermined amounts.

5. A pre-wired support assembly as in claim 1 wherein said wiring assembly includes a power cable, a data communication cable and a keyboard cable.

6. A pre-wired support assembly as in claim 1 wherein said roller means comprises a roller bracket having at least a pair of bearings affixed thereto whereby said pair of roller bearings are adapted to cooperates with said inner surface of said shoulder members to form a bearing race assembly capable of slidably supporting said support member from said elongate channel member.

7. A pre-wired support assembly as in claim 1 wherein said roller means further comprises at least two pair of spaced apart bearings disposed on said roller bracket such that a first pair of bearings abuttingly engages said inner surface of said shoulder members and said second pair of bearings abuttingly engages said outer surface of said shoulder members for increasing the stability of said roller means.

8. A pre-wired support assembly as in claim 1 further comprising a cable truck assembly for rollingly supporting said monitor wiring assembly on said elongate member, said cable truck assembly disposed adjacent said roller means and including a nylon base, two pair of spaced apart bearings and a means for collecting said wiring assembly, said two pair of bearings abuttingly engaging said inner surface of said shoulder members for slidably supporting said wiring assembly.

9. A pre-wired support assembly for supporting a computer monitor from a drop ceiling assembly having a plurality of ceiling rails comprising:

an elongate channel member including a central section, a pair of spaced apart legs extending from said central section and a pair of shoulder members each extending in a facing relationship toward each other from each of said pair of legs, said shoulder members defining an inner bearing raceway and an outer bearing raceway;

a clamp means for affixing said elongate channel member to said ceiling rail;

a telescopically adjustable support member having a first end and a curved second end and an internal cavity extending completely therethrough;

a roller bracket including a plurality of roller bearings for slidably connecting said first end of said support member to said shoulder members of said elongate channel member, said bearings abuttingly engaging and slidable along said inner and outer bearing raceways in a horizontal direction;

a substantially planar monitor platform affixed to said second end of said support member for supporting a computer monitor including a keyboard tray for supporting a keyboard; and a computer monitor wiring assembly for providing power, and data communication to said monitor wherein said support member internal cavity is adapted to receive said monitor wiring assembly and said elongate channel member is further adapted to receive said wiring assembly.

10. A support assembly for supporting a monitor from a ceiling rail comprising:

an elongate channel member fixable to said ceiling rail;

a monitor platform;

a pair of elongated tubular support members, one of the support members including a first segment telescopically mounted to the other support member and a second segment extending from the first segment and having a curved shape whereby at least a portion of the monitor platform is disposed directly below the first platform segment;

roller means for slidably connecting said first end of said support member to said elongate channel member, said roller means slidable along said elongate channel member in a horizontal direction;

a monitor platform affixed to said second end of said support member for supporting a monitor; and a monitor wiring assembly for providing power and data communication to said monitor wherein said support member internal cavity is adapted to receive and guide said monitor wiring assembly to said elongate channel member.

11. A support assembly for supporting a monitor from a ceiling rail comprising:

an elongate channel member affixable to said ceiling rail;

a support member having a first end and a second end and an internal cavity extending completely therethrough;

roller means for slidably connecting said first end of said support member to said elongate channel member, said roller means slidable along said, elongate channel member in a horizontal direction;

a monitor platform affixed to said second end of said support member for supporting a monitor and having an extending keyboard tray for supporting a computer keyboard; and a monitor wiring assembly for providing power and data communication to said monitor wherein said support member internal cavity is adapted to receive and guide said monitor wiring assembly to said elongate channel member.

12. A support assembly for supporting a monitor from a ceiling rail comprising:

an elongate channel member affixable to said ceiling rail; a support member having a first end and a second end and an internal cavity extending completely therethrough;

roller means for slidably connecting said first end of said support member to said elongate channel member, said roller means slidable along said elongate channel member in a horizontal direction;

a monitor platform affixed to said second end of said support member for supporting a monitor; and a monitor wiring assembly for providing power and data communication to said monitor wherein said support member internal cavity is adapted to receive and guide said monitor wiring assembly to said elongate channel member; and means for biasing said monitor wiring assembly in a direction away from said elongate channel member.

13. A support assembly of claim 12 wherein said wiring assembly includes at least a power cable, a data communication cable and a keyboard cable.

* * * * *

UNITED STATES PATENT AND TRADEMARK OFFICE
CERTIFICATE OF CORRECTION

PATENT NO. : 5,405,117
DATED : April 11, 1995
INVENTOR(S) : Davis

It is certified that error appears in the above-indentified patent and that said Letters Patent is hereby corrected as shown below:

Column 6, line 37, delete "ho] .low" and insert therefor ---hollow---.

Signed and Sealed this

Twenty-seventh Day of June, 1995

Attest:

BRUCE LEHMAN

Attesting Officer      Commissioner of Patents and Trademarks